March 28, 1967 SABURO MUROGA 3,311,887

FILE MEMORY SYSTEM WITH KEY TO ADDRESS TRANSFORMATION APPARATUS

Filed April 12, 1963 7 Sheets-Sheet 1

INVENTOR
SABURO MUROGA

BY
Bernard N. Wiener

ATTORNEY

March 28, 1967 SABURO MUROGA 3,311,887

FILE MEMORY SYSTEM WITH KEY TO ADDRESS TRANSFORMATION APPARATUS

Filed April 12, 1963 7 Sheets-Sheet 3

March 28, 1967 SABURO MUROGA 3,311,887

FILE MEMORY SYSTEM WITH KEY TO ADDRESS TRANSFORMATION APPARATUS

Filed April 12, 1963 7 Sheets-Sheet 4

3,311,887

FILE MEMORY SYSTEM WITH KEY TO ADDRESS TRANSFORMATION APPARATUS

Saburo Muroga, Yorktown Heights, N.Y., assignor to International Business Machines Corporation, New York, N.Y., a corporation of New York Filed Apr. 12, 1963, Ser. No. 272,707
18 Claims. (Cl. 340—172.5)

This invention relates generally to an information handling system for a plurality of information records and apparatus for handling them in accordance with an inherent attribute of each record. It relates more particularly to a file memory system with key to address transformation apparatus for uniquely designating an address in the memory for an information record in accordance with the nature of a respective key.

An information record includes indicia of various abstractions, e.g., data from physical experiments or business operations. An information record is handled if its information content is transferred from one location to another location. The handling may include transmission, storage and retrieval aspects. It is often desirable to handle an information record in accordance with an associated key or identifier. The key may be a part of the information content of the information record. In a file memory system, it is desirable to identify quickly and in an economical way an address for an information record in the memory thereof in accordance with an attribute of the associated key. Usually, the memory must be searched until the proper entry compares with the given key or there must be a table look-up which retains an indication of the memory location for the particular record involved. The former technique is time-consuming and the latter technique requires additional memory space for the comparison table.

Heretofore, techniques have been devised for obtaining key to address transformation based on empirical premises. Such empirical techniques have the disadvantage that their applicability is limited to especially characterized types of information records and the quantity thereof to be handled. It is desirable that a key to address transformation for the handling of information records and the addressing of a file memory system be universally applicable, whatever may be the type and quantity of the information records to be handled.

When an input sequence of characters, e.g., a binary digit sequence, is given and a search is to be made in a file memory for information associated with the input sequence, it is generally difficult to have both a fast access time and minimal empty space in the memory. Illustratively, assume N binary codes of $n$ bits are an input roster of keys having associated information records. When N is equal to or almost equal to $2^n$, a file memory with a capacity for $2^n$ words is required. If the binary codes themselves are used as the addresses of the memory, there is little difficulty in addressing it. However, if N is much smaller than $2^n$, the capacity of the memory need not be as large as $2^n$ words for economy of memory space.

In this case, if the capacity is equal to N or a little over N, a problem is encountered of how to arrange information associated with keys in the memory and how to address it. Since the input keys are not consecutive binary numbers because N is less than $2^n$, the keys cannot be used as addresses.

It is an object of this invention to provide a method and apparatus for addressing a memory.

It is another object of this invention to provide an information handling system for a plurality of information records.

It is another object of this invention to provide an information handling system for a plurality of information records having associated keys, respectively.

It is another object of this invention to provide an information handling system for a plurality of information records having associated keys, respectively, which includes key to address transformation apparatus to provide a transformation of a key to a function thereof.

It is another object of this invention to provide an information handling system for a plurality of information records having associated keys, respectively, which includes key to address transformation apparatus to provide a linear transformation of a key to a function thereof.

It is another object of this invention to provide method and apparatus for handling an information record in a memory by characterizing the information record as an element in an ordered array of elements and handling the information record in accordance with the ordered array.

It is another object of this invention to provide method and apparatus for information handling for a plurality of information records having keys, respectively, by transforming the keys to elements in an ordered array; and handling the information records in accordance with the ordered elements.

It is another object of this invention to provide method and apparatus for information handling by linearly transforming the keys to elements in an ordered array and handling the information records in accordance with the ordered elements.

It is another object of this invention to provide an information handling system for a plurality of information records having keys, respectively, which includes apparatus for characterizing the keys as codes in a group array and apparatus for designating an address in a file memory in accordance with the parity-check sequence, respectively, for said codes.

It is another object of this invention to provide an information handling system for a plurality of information records having keys, respectively, which includes apparatus for characterizing the keys as codes in a group array and apparatus for providing an address in a file memory in accordance with a parity-check sequence for each of the codes.

It is another object of this invention to provide an information handling system for a plurality of information records having keys, respectively, which includes apparatus for characterizing the keys as codes in a group array and apparatus for providing an address in a file memory in accordance with a parity-check sequence for each subset of the codes.

It is another object of this invention to provide an information handling system for a plurality of information records having associated keys, respectively, which includes apparatus for characterizing the keys as elements in a group array and apparatus for transforming the keys to functions thereof. The functions designate addresses for the information records in a file memory, respectively.

It is another object of this invention to provide an information handling system for a plurality of information records having associated keys, respectively, which includes apparatus for characterizing the keys as codes in particular rows of a group array and apparatus for identifying the respective rows of the group array thereby designating addresses in a file memory system for the information records associated with the codes of the rows, respectively.

It is another object of this invention to provide an information handling system for a plurality of information records having associated keys which includes apparatus for characterizing the keys as elements in a group array and apparatus for transforming the keys to associated addresses in a file memory, respectively, such that information records associated with keys within a particular distance property of each other are established in the same memory bucket. Here a bucket indicates an aggregate of memory locations.

It is another object of this invention to provide an information handling system for a plurality of information records having associated keys, respectively, which includes apparatus for characterizing the keys as elements in a group array and transformation apparatus for addressing a file memory and acquiring information associated with a correct key even though a given key has certain erroneous positions.

It is another object of this invention to provide a file memory system with key to address transformation apparatus which transforms each key associated with an information record as a code in a group array to a respective function which designates an address in the memory.

It is another object of this invention to provide a key to address transformation apparatus which transforms a key associated with an information record to a function thereof, which designates an address in a memory.

It is another object of this invention to provide a key to address transformation apparatus for a key associated with an information record in which the key characterized as a binary digit sequence in a group array is transformed to a respective parity-check sequence, which identifies an address in memory.

The foregoing and other objects, features and advantages of the invention will be apparent from the following more particular description of preferred embodiments of the invention as illustrated in the accompanying drawings.

Figure 1:
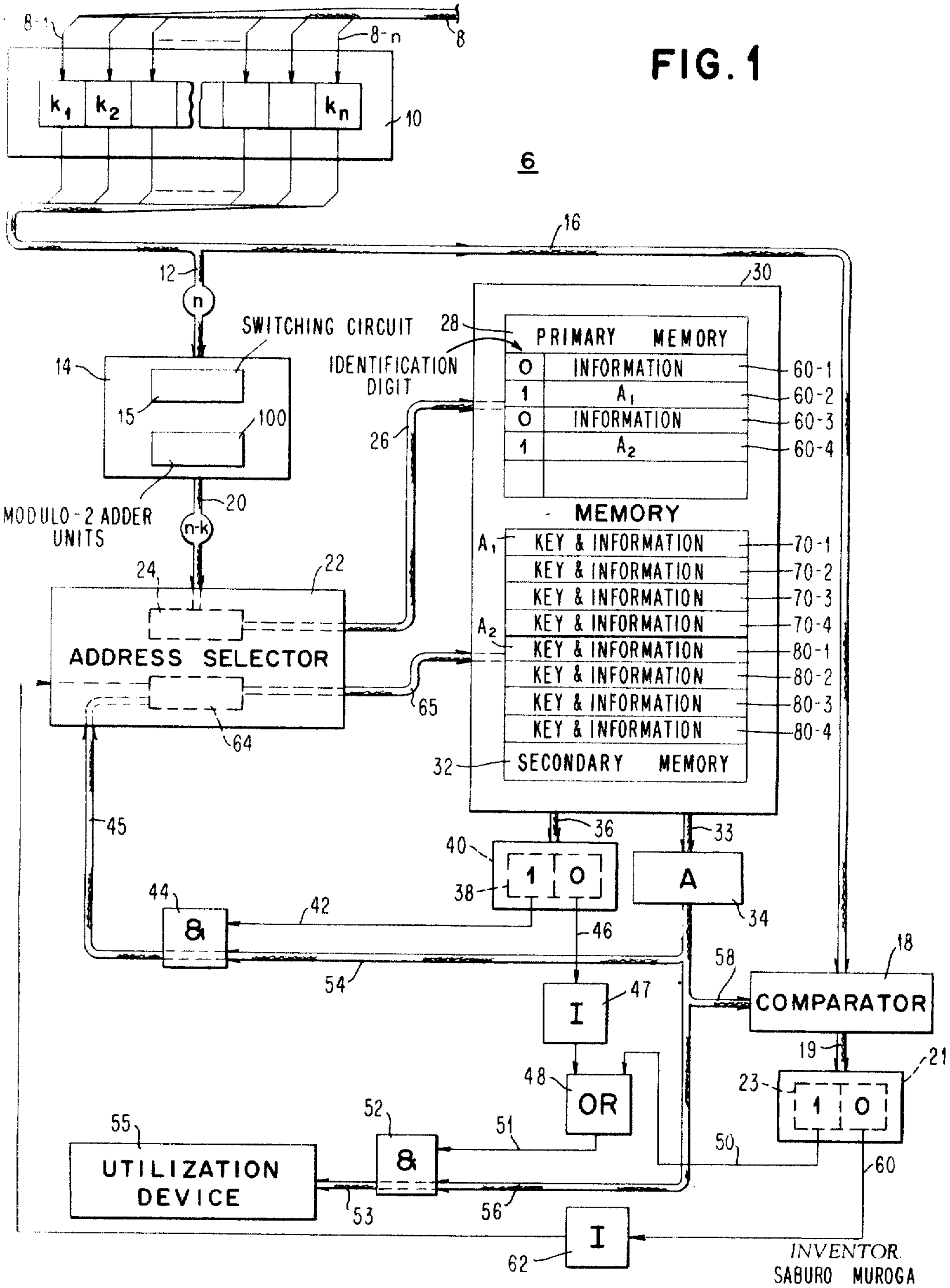
FIGURE 1 is a block diagram of an embodiment of the invention illustrating the use of a primary and secondary memory when some of the input keys are characterized as more than one code per row of a group array.

For the practice of this invention, the keys associated with a plurality of information records are established as codes, respectively, in a group array.

By the transformation based on the structure of a group array, non-consecutive binary numbers represented by keys are transformed into consecutive or almost consecutive binary numbers having fewer digits. Accordingly, an information record associated with a key is established in an ordered location in a memory.

This invention provides an information handling system for a plurality of information records. It includes key to address transformation apparatus which provides a transformation of a key associated with each information record to an associated address in a memory. The keys are characterized as codes in a group array and the transformation provides functions thereof, respectively, which designate addresses in the memory at which the information records, respectively, are located.

Generally, the functions are Boolean functions. In particular, the keys are binary digit sequences and the functions are the digits of a parity-check sequence for the respective code in the group array.

One feature of the invention characterizes keys related to a plurality of information records in a coset expansion of a group, each key is transformed to a sequence of digits each of which is a function of digits of the key and which are used to designate an address in a memory. If there is at most one key in a code row of the group array, the address of the information record related to the key is designated directly by the functions in a primary memory. If there is more than one key in a row in the group array, the entry of the corresponding memory location in a primary memory designates a starting address for a secondary memory. In the secondary memory, the information records associated with the keys in the particular row of the group array are sequentially established.

Another feature of this invention utilizes a distance property of error-correcting codes. Certain codes thereof are taken to be the key associated with the given plurality of information records, respectively. In one aspect of this feature, the keys within a given distance of each other are located in the same column of the group array, and the related information records are established in a particular bucket of a memory designated by the codes of the first row in the column in which the given key appears. In another aspect of this feature, even though a given key has certain erroneous positions, it is utilized to identify an address in a memory for the information record for a correct key.

The practice of this invention contemplates the following procedure:

(1) First, an $(n, k)$ group code array is characterized which includes the given roster of keys in a manner that a related parity-check operation transforms a given key to an address. The group code array is obtained in accordance with conventional techniques, e.g., by a digital computer which may be integrated with the file memory system.

(2) Circuits to provide the parity-check operation are incorporated in the file memory system. If a file memory system is used for more than one roster of keys from time to time, a parity-check operation for each roster of keys may be incorporated therein and the change of different parity-check operations may be accomplished by a plug-wire board or a punch card which change interconnection of circuits for the parity-check operations, while information in the file memory is to be rearranged accordingly.

This invention may be practiced with either a permanent or semi-permanent memory. However, it is especially useful for a permanent memory. Illustratively, in the art of pattern recognition, a given pattern is represented by a binary code as a result of assigning a "1" or "0" to each of its present and absent attributes, respectively. Then, information corresponding to a given pattern may be found readily in a file memory having a permanent memory according to the practice of this invention.

Generally, the objective fastest access time and the minimal number of empty memory spaces cannot be obtained at the same time. These factors depend on the distribution of keys, i.e., roster of keys out of all possible $2^n$ binary codes. Therefore, it is necessary to compromise between the objectives and this invention provides means for any degree of compromise made.

*Coset expansion of a group*

Some aspects of group theory which are pertinent for the practice of this invention will now be described. Background references of interest for the subject are:

(a) Article; "A Class of Binary Signaling Alphabets,"

by D. Slepian, Bell System Technical Journal, January 1956, p. 203, et seq.

(b) Book: "Theory and Applications of Finite Groups," by G. A. Miller, et al., G. E. Stecker & Co., New York, 1938.

A "group" is defined as a set of elements satisfying the following conditions:

(1) A unique product between any two elements exists in the group.

(2) The product operation is associative.

(3) There exists an identity element whose product with any other element of the group gives the element itself.

(4) There exists an inverse element for every element of the group such that the product thereof gives the identity element. In particular, when the product operation is commutative, the group is called an Abelian group. When a subset of elements in a group satisfies the above four properties, it is called a subgroup.

When each of binary codes has $n$ bits length, the number of all possible binary codes is $2^n$. The product between two binary codes, $U=(u_1, u_2, \ldots u_n)$ and $V=(v_1, v_2, \ldots v_n)$ is defined as $$U \oplus V=(u_1 \oplus v_1, u_2 \oplus v_2, \ldots u_n \oplus v_n)$$

where $\oplus$ denotes modulo-2 addition and $u_i$ and $v_i$ ($i=1, 2, \ldots n$) are either "1" or "0." By this definition of a product, all $2^n$ binary codes form an Abelian group. An $(n, k)$ group code is an Abelian subgroup of this group whose number of binary codes is $2^k$.

The Abelian group of $2^n$ binary codes can be expanded in the following group code array through a coset expansion using any subgroup of it which is an $(n, k)$ group code,

*Table I*

| I | $A_2$ | $A_3$ | $A_\mu$ |
|---|---|---|---|
| $S_2$------ | $S_2 \oplus A_2$ | $S_2 \oplus A_3$ | $S_2 \oplus A_\mu$ |
| $S_3$------ | $S_3 \oplus A_2$ | $S_3 \oplus A_3$ | $S_3 \oplus A_\mu$ |
| $S_\nu$-------- | $S_\nu \oplus A_2$ | $S_\nu \oplus A_3$ | $S_\nu \oplus A_\mu$ |

where $\mu=2^k$ and $\nu=2^{n-k}$. All binary codes in the first row form a subgroup. I is an identity element. The second to the last rows are termed cosets and an element in each coset and in the first column is termed the coset leader of that coset.

The construction of the array by a coset expansion of a group is as follows. Assume a subgroup, i.e. all elements in the first row to be given. Then any binary code is selected from the rest of all $2^n$ binary codes and placed as $S_2$. A product of $S_2$ with an element $A_i$ in the first row is formed and placed in the column of $A_i$. Thus, the second row is formed. Any binary code is selected from the rest of the codes (other than binary codes in the first and the second rows), e.g., $S_3$, and $S_3 \oplus A_i$ is formed and placed in the column of $A_i$. Thus, the third row is formed.

This process is repeated until all $2^n$ binary codes are exhausted. An illustrative example is provided hereinafter.

This group array or coset expansion of a group has the following important properties:

(1) All $2^n$ binary codes of the group appear in the array without duplication. No matter what binary code in a coset is chosen as the coset leader of that coset, the same set of binary codes is obtained for that coset except for the difference in the order of appearance of binary codes therein. Independent of which coset comes next, the same set of cosets is obtained except for the difference in the order of their appearance.

(2) A binary sequence $(p_1 p_2 \ldots p_{n-k})$ calculated by the parity-check operation on a binary code $(b_1, b_2 \ldots b_n)$ $$p_j=\sum_{i=1}^{n} \gamma_{ij} b_i$$

($j=1, 2, \ldots n-k$), where $\Sigma$ means modulo-2 addition and $\gamma_{ij}$ is either 1 or 0, is the same for any binary code in the same row. The set of $\gamma_{ij}$'s is obtained from the subgroup of the array i.e., the first row. Illustratively, consider a roster of binary codes with 4 bits length each. The set of 16 binary codes ($=2^4$) forms an Abelian group and there exist a number of subgroups. Consider a subgroup formed by (0000), (1011), (0101), (1110), which is a (4, 2) group code. Based on this particular subgroup, there is obtained the following coset expansion:

| | | | |
|---|---|---|---|
| 0000 | 1011 | 0101 | 1110 |
| 0100 | 1111 | 0001 | 1010 |
| 0010 | 1001 | 0111 | 1100 |
| 1000 | 0011 | 1101 | 0110 |

where (0000) is an identity element of the subgroup. The parity-check operation for the subgroup is $$p_1=b_1 \quad \oplus b_3$$
$$p_2=b_1 \oplus b_2 \quad \oplus b_4$$

A parity-check sequence for any binary code in the first row is $p_1=0$, $p_2=0$. The parity-check sequences for the second, third and fourth rows are (0, 1), (1, 0) and (1, 1), respectively.

*Determination of coefficient matrix from a subgroup*

The coefficient $\gamma_{ij}$ required for the parity-check operation $$p_j=\sum_{i=1}^{n} \gamma_{ij} b_i$$

($j=1, 2, \ldots n-k$) are obtained as follows when a subgroup, i.e., the first row of a coset expansion is known. Any binary code in a subgroup with $2^k$ binary codes can be expressed as a modulo-2 sum of generators $G_1$, $G_2$, $\ldots$ $G_k$ with a proper choice of binary coefficients $g_1$, i.e., $g_i=1$ or 0;

$$\sum_{i=1}^{k} g_i G_i$$

Two binary codes of the subgroup are arbitrarily designated as $G_1$ and $G_2$. All sums $$\sum_{i=1}^{2} g_i G_i$$

are formed by assigning all possible combinations of ones and zeroes for the $g_i$'s. The resultant binary codes are eliminated from the subgroup. Consider $G_3$ to be one of the remaining binary codes. All sums $$\sum_{i=1}^{3} g_i G_i$$

are then formed and removed from the subgroup. The procedure is repeated until all binary codes are eliminated from the subgroup. The result is a binary matrix with these $k$ generators as its rows. This matrix can be rewritten as $$\underbrace{[I:G]}_{n \text{ columns}}\}k \text{ rows}$$

where I is a unit matrix with ones in only diagonal entries and with zeros in the rest, by the following procedure:

(1) Modulo-2 addition of rows to a row, and (2) Exchange of columns, or exchange of rows.

The parity-check operation $$p_j=\sum_{i=1}^{n} \gamma_{ij} b_i$$

is expressed in a matrix form as $$(p_1, \ldots p_{n-k}) = (b_1, \ldots b_n) \cdot \begin{bmatrix} G \\ I \end{bmatrix}$$

$$\begin{bmatrix} p_1 \\ \cdot \\ \cdot \\ \cdot \\ p_{n-k} \end{bmatrix} = [G^T I] \cdot \begin{bmatrix} b_1 \\ \cdot \\ \cdot \\ \cdot \\ b_n \end{bmatrix}$$

where $G^T$ is the transpose of the matrix G.

Illustratively, consider the following subgroup: 00000, 11111, 01010, 10101, 00011, 11100, 01001, 10110. Any two binary codes, $G_1$ and $G_2$ are chosen, e.g., $$G_1 = 11111 \text{ and } G_2 = 01010$$

By assigning 1 and 0 to $g_1$ and $g_2$ in all possible combinations, the following codes are obtained from $g_1G_1 + g_2G_2$; 00000, 11111, 01010, 10101. For example, for $g_1 = g_2 = 1$, there is obtained 10101. If all of these binary codes are eliminated from the subgroup, the rest will be 00011, 11100, 01001 and 10110. Among them, $G_3 = 00011$ is chosen. If the sum $g_1G_1 + g_2G_2 + g_3G_3$ is formed, binary codes obtained by assigning 1 and 0 to $g_1$, $g_2$ and $g_3$ exhaust all binary codes of the subgroup.

A resultant matrix is $$\begin{bmatrix} 1 & 1 & 1 & 1 & 1 \\ 0 & 1 & 0 & 1 & 0 \\ 0 & 0 & 0 & 1 & 1 \end{bmatrix}$$

The second row is added to the first row modulo-2, the result is $$\begin{bmatrix} 1 & 0 & 1 & 0 & 1 \\ 0 & 1 & 0 & 1 & 0 \\ 0 & 0 & 0 & 1 & 0 \end{bmatrix}$$

The third and the fourth columns are exchanged, the result is $$\begin{bmatrix} 1 & 0 & 0 & 1 & 1 \\ 0 & 1 & 1 & 0 & 0 \\ 0 & 0 & 1 & 0 & 1 \end{bmatrix}$$

The third row is added to the second row modulo-2, the result is $$\begin{bmatrix} 1 & 0 & 0 & 1 & 1 \\ 0 & 1 & 0 & 0 & 1 \\ 0 & 0 & 1 & 0 & 0 \end{bmatrix}$$

The parity-check operation is now $$(p_1, p_2) = (b_1, b_2, b_3, b_4, b_5) \begin{bmatrix} 11 \\ 01 \\ 00 \\ \cdot\cdot \\ 10 \\ 01 \end{bmatrix}$$

or equivalently $$\begin{aligned} p_1 &= b_1 \quad \oplus b_4 \\ p_2 &= b_1 \oplus b_2 \quad \oplus b_5 \end{aligned}$$

*Uses of coset expansion under various circumstances*

The following discussion indicates the use of the coset expansion of an Abelian group under various circumstances. There is a different objective for each circumstance as follows:

(1) First circumstance: Fast access time is the primary objective and minimization of the number of empty locations is a desirable but secondary objective. There are many choices for the subgroup in the first row of the coset expansion because there exist a large number of subgroups for the group of $2^n$ binary codes. A subgroup is chosen with the property that in a coset expansion related to the subgroup each row has at most one key, and the number or rows which have no keys is minimum.

When such a subgroup is obtained, a set of $\gamma_{ij}$'s for a parity-check operation related with the subgroup is obtained in accordance with the discussion which will be provided next. Each parity-check sequence corresponds to at most one of the keys. Therefore, information associated with each key is stored in a memory location which has a parity-check sequence corresponding to the key as an address of the file memory. When a key having digits $(k_1, k_2, \ldots k_n)$ is given, a parity-check sequence of digits, $(p_1, p_2, \ldots p_{n-k})$ is computed by the parity-check operation $$p_j = \sum_{i=1}^{n} \gamma_{ij} k_i$$

$(j = 1, 2, \ldots n-k)$, where $\Sigma$ is modulo-2 addition. This parity-check operation may be realized for the practice of this invention by a circuit with extremely fast speed of operation since only modulo-2 addition is required. By using the parity-check sequence as an address of a file memory, an information record associated with the given key is located in a memory location having that parity-check sequence as its address. The memory locations whose addresses correspond to the parity-check sequences for empty rows do not have entries. Illustratively, when (1011), (0100) and (1001) are given as keys, the following is a suitable coset expansion for the practice of the first feature of this invention:

| Coset expansion | | | | Parity-check sequence |
|---|---|---|---|---|
| 0000 | 1011 | 0101 | 1110 | 00 |
| 0100 | 1111 | 0001 | 1010 | 01 |
| 0010 | 1001 | 0111 | 1100 | 10 |
| 1000 | 0011 | 1101 | 0110 | 11 |

The parity-check operation is $$\begin{aligned} p_1 &= k_1 \quad \oplus k_3 \\ p_2 &= k_1 \oplus k_2 \quad \oplus k_4 \end{aligned}$$

Therefore, an embodiment of the invention will have a circuit for this operation. There will be storage of information records associated with keys (1011), (0100) and (1001) in the memory locations having addresses, 00, 01 and 10, respectively. No information will be stored in the location with an address 11. Generally, the choices of subgroups are limited, though the number of possible subgroups is numerous, and a group array with non-existence of empty rows may not be readily obtained. If an attempt is made to reduce the number of empty rows, some rows may have more than one key. A compromise must be made as will be explained in the following second circumstance (2).

(2) Second circumstance: Both minimization of the number of empty memory locations and fast access time are primary objectives. As these are somewhat contradictory requirements, a compromise is made. In circumstance (2), the number of empty rows is reduced by having more than one key in some rows. Information records are stored in memory locations having parity-check sequences as addresses as for circumstances (1). When more than one information record must be stored at an address because a row corresponding to the parity-check sequence for that address has more than one key, a secondary memory is provided. An information record is stored in the primary memory, if the associated key is the only key having the parity-check sequence corresponding to its address, i.e., if it is the only key in a row. If a key shares a row with other keys, a starting address, for a bucket of information records which are associated with keys in a row in the secondary memory, is stored in the memory location of the primary memory with the parity-check sequence as an address. After the primary memory is addressed, and the secondary memory is addressed, a search is made through the designated bucket of the secondary memory until information corresponding to the given key is obtained.

The secondary memory has been distinguished from the primary memory simply for conceptual convenience. They can be different portions of the same memory. Alternatively, a random access memory may be used as the primary memory and a serial access memory such as a magnetic drum or tape may be used as the secondary memory.

(3) Minimization of the number of empty memory locations is the primary objective and fast access time is a secondary objective. For the circumstance (3), the objective is to reduce further the number of empty locations to a minimum. The primary memory stores only starting addresses of the secondary memory. In particular, when the secondary memory bucket size is uniform, the primary memory need not be used. The secondary memory is directly addressed by parity-check sequences with zeros added to their ends. The lengthened parity-check sequences are the addresses of the buckets of the secondary memory.

The article "Addressing for Random Access Memory," IBM Journal of Research and Development, by W. W. Peterson, April 1957, pp. 130–145, describes an open method for reducing further the number of empty locations and for adding flexibility. When an addressed bucket for a key is full, a search is made over the following buckets until an empty location is found and the information record for the key is stored there. When a key is given for inquiry to the memory, a search is made through buckets starting with the bucket having the parity-check sequence for the key as its starting address.

The above classification of circumstances is general and there may be a further classification by taking into account their more detailed characteristics. These cases may be regarded as special cases of the above cases.

(4) Fourth circumstance: The case when the number of given keys is large and, accordingly, distribution of keys may be assumed to be nearly random. This circumstance may be practiced as a special case of circumstance (3).

(5) Fifth circumstance: The case when the number of given keys is small. This circumstance may be practiced as a special case of either circumstance (1) or circumstance (3).

(6) Sixth circumstance: Some keys are used more often than others, and access time is to be minimized. This circumstance may be practiced as a special case of circumstance (2). The keys which are seldom used are included in as few rows of a group array as possible, and the often used keys are placed as one key per row therein.

*Procedures for obtaining a group code array for a given roster of keys*

The following are procedures for obtaining a subgroup for a given roster of keys so that the resulting group code array is suitable for the practice of this invention.

(1) An exhaustive procedure: One procedure is to exhaust all subgroups of $2^k$ binary codes. If $k$ linearly independent binary codes, $G_1, G_2, \ldots G_k$ are chosen, all binary codes of an Abelian subgroup are generated by the linear sum $$\sum_{i=1}^{n} g_i G_i$$

by exhausting all possible combinations of ones and zeros for $g_1, g_2, \ldots g_n$, where the $g_i$'s are "1" or "0," where $g_iG_i=G_i$ or I, I is an identity element (00 . . . 0), as $g_i$="1" or "0," respectively, and where Σ denotes modulo-2 addition digit by digit. The $G_i$'s are termed generators of the subgroup. If all possible combinations of generators are exhausted, all possible subgroups are exhausted.

For large $n$ and $k$, by taking the following properties into account, the time for exhaustion of all possible subgroups can be reduced. A linearly independent set of codes is selected from a number of keys to be included in the first row. These independent codes are chosen as generators and binary codes which are not keys are chosen as other generators. A check is made to determine if the binary codes generated include the keys which are not expected to be in the first row. If the keys are included, another combination of generators is tried. The procedure is repeated until only the keys which are expected to be in the first row appear in the binary codes generated from generators. A subgroup in the first row and all binary codes of the second row form a bigger subgroup. The number of binary codes is $2^{k+1}$ and a coset leader $S_2$ is the $(k+1)$st generator of this subgroup. Therefore, if the second row is to include some number of keys from the roster, one of the keys is chosen as $S_2$ and a check is made to determine if the first and second row include keys which are expected to be in the first and second rows.

The first row which is a subgroup itself and three cosets led by $S_2$, $S_3$ and $S_2 \oplus S_3$ form an even bigger subgroup. By continuing the procedure, the range of search for an optimum subgroup is narrowed down.

(2) Bisection procedure: This procedure provides at least a pseudo-optimum subgroup. N binary codes of $n$ bits long are arranged in a matrix form. A column is determined which has equal or almost equal numbers of ones and zeros. If no such column exists, the other columns are added modulo-2 on one of the columns digit by digit. A check is made to determine if the resulting column has equal or almost equal numbers of ones and zeros. When such a column or an added column is obtained, the keys of the roster are divided into two groups, one with ones in that column and the other with zeros.

Next, another column or an added column is to be found which further divides each of previously bisected groups of keys into two groups according to ones and zeros in that column. The procedure is repeated until each divided group of keys includes at most one key and a minimum or satisfactorily small number of columns is obtained. These $(n-k)$ columns are $$p_1=\sum_{i=1}^{n}\gamma_{i1}k_i$$

$$p_2=\sum_{i=1}^{n}\gamma_{i2}k_i$$

$$\cdot$$
$$\cdot$$
$$\cdot$$

$$p_{n-k}=\sum_{i=1}^{n}\gamma_{in-k}k_i$$

where the column $p_j$ is the result by adding columns $k_i$'s having $\gamma_{ij}=1$. This set of equalities gives parity-check sequences for which every row of a coset expansion includes at most one key.

If the procedure is stopped when some of the divided groups of keys includes a certain number of keys, a parity-check operation is obtained for which some rows of a coset expansion include more than one key.

For example, when the following roster of keys is given 1110
1111
1000
0111 the third column is added modulo-2 on the first, the result is 0110
0111
1000
1111

The third and fourth columns are added on the second, the result is 0010
0111
1000
1111

The first two columns divide keys to each single key. By tracing back which columns are added, the following partiy-check operation is obtained:

$$p_1=k_1\oplus k_3$$
$$p_2=k_2\oplus k_3\oplus k_4$$

A coset expansion corresponding to this operation

| | | | | $p^1$ | $p^2$ |
|---|---|---|---|---|---|
| 0000 | 0101 | 1011 | 1110 | 0 | 0 |
| 1010 | 1111 | 0001 | 0100 | 0 | 1 |
| 0110 | 0011 | 1101 | 1000 | 1 | 0 |
| 0010 | 0111 | 1001 | 1100 | 1 | 1 |

where the underlining indicates the given roster of keys.

Another example is now provided. When the following roster of keys is given 1110
1101
1111
0101 the third column is added modulo-2 to the second column, the result is 1010
1101
1011
0101

The first and fourth columns are added to the third column, the result is 1000
1101
1011
0111

Therefore, the parity-check operation is $$p_1=k_2\oplus k_3$$
$$p_2=k_1\oplus k_3\oplus k_4$$

The corresponding coset expansion is

| | | | | $p_1$ | $p_2$ |
|---|---|---|---|---|---|
| 0000 | 1110 | 0111 | 1001 | 0 | 0 |
| 1010 | 0100 | 1101 | 0011 | 1 | 0 |
| 0110 | 1000 | 0001 | 1111 | 0 | 1 |
| 0010 | 1100 | 0101 | 1011 | 1 | 1 |

where the keys of the given roster of keys are underlined. If the coset expansion in the previous example is used for the present roster of keys, it has some row which has more than one key.

(3) Procedure using a coset expansion whose coset leaders form a subgroup. There exists a coset expansion whose coset leaders include a given roster of keys and form a subgroup. The article, "Group Codes for Prescribed Error Patterns," by R. T. Chien, IRE International Convention Record Part 4, 1960, page 125, provides an exposition on this point. A subgroup is formed from a given roster of keys or a part of it. A coset expansion is then constructed which includes that subgroup as coset leaders.

(4) Procedure basing upon error-correcting codes. Many error-correcting codes with various combinations of *n, k* and distance are known. In error-correcting code theory, the distance, i.e., the Hamming distance, between two binary sequences is defined as the number of corresponding digits in which the sequences differ. A set of $2^k$ binary sequences where each sequence is *n* bits long and where every pair of binary sequences has distance of at least *d* is termed an *(n, k)* error-correcting code of distance *d*. The noted article by D. Slepian presents some error-correcting codes of non-polynomial type.

Polynomial-type error-correcting codes presented in the book by W. W. Peterson, "Error-Correcting Codes," The M.I.T. Press, 1962, can be converted into group codes. Accordingly, coset expansions and parity-check operations can be obtained through their use. If an error-correcting code with proper *k* and proper distance property is selected, it will be useful for the practice of this invention.

The procedures can be programmed and processed by a general purpose digital computer. See for programming: a book by D. D. McCracken, "Digital Computer Programming," John Wiley and Sons, Inc., 1957.

*Practice of Feature I*

The practice of the first feature of this invention will now be described. According to the above procedures for forming coset expansions, a group array for a given roster of keys is obtained as by programming a digital computer. The corresponding parity-check operation is obtained. A logical operator is provided for this parity-check operation and the information records are arranged in a file memory according to the parity-check operation. After this arrangement, the practice of the first feature of this invention includes the following operations:

(a) First, a parity-check operation is performed on a given key by a logical circuit. A binary code which is the output of the circuit is called a parity-check sequence.

(b) Second, the parity-check sequence obtained is used as an address in the file memory.

(c) Third, information associated with a key is found in an entry in the file memory with the address obtained, unless the entry corresponds to more than one key. If the entry corresponds to more than one key, it gives a starting address of an aggregate of memory locations, termed a "bucket," in a secondary memory. By reading out a starting address from the entry, a search is made through a bucket until the information record corresponding to the given key is reached.

*Implementation of Feature I*

Figure 2:
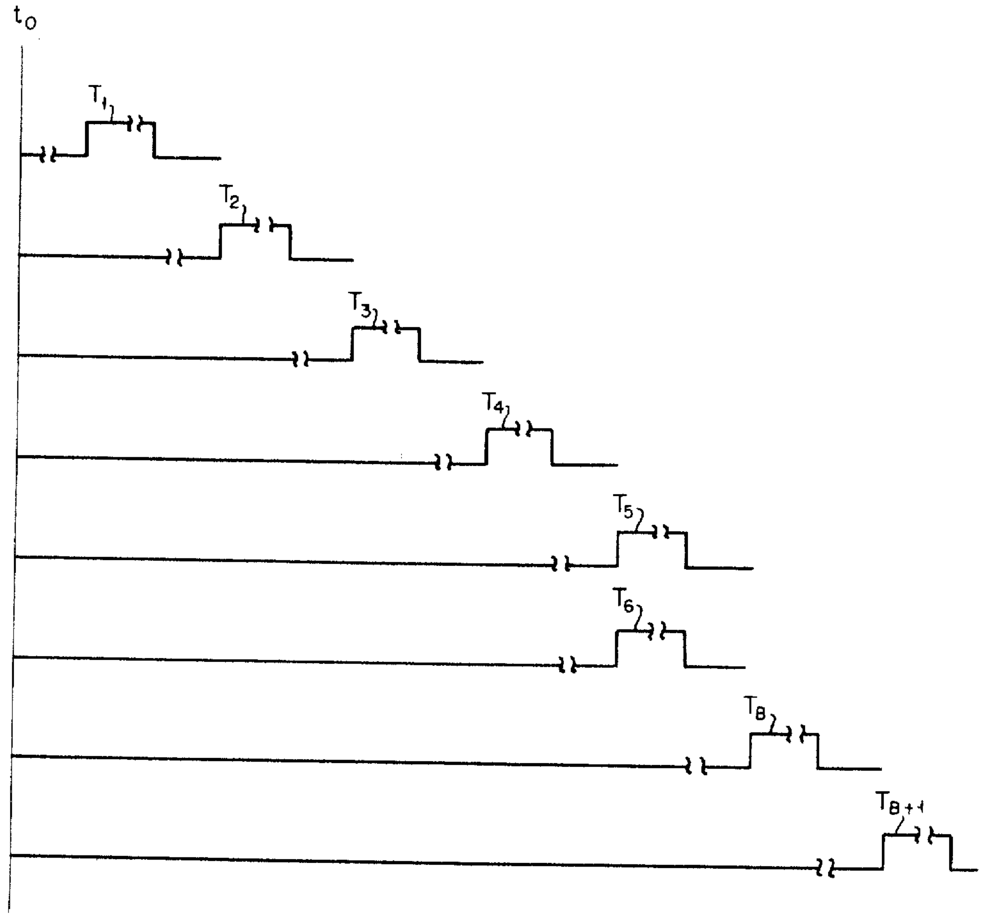
FIGURE 2 is a timing diagram useful for explaining the timing operation of the several embodiments of the invention.

The nature and operation of an embodiment 6 of the first feature of this invention will be described with reference to FIGS. 1 to 5, of which FIG. 1 is a block diagram of apparatus for designating an address location in a memory which corresponds to a key in a roster of keys. FIG. 2 is a timing diagram therefor, and FIGS. 3 to 6 illustrate FIG. 1 in greater detail.

Generally, a key $K=k_1, k_2, \ldots k_n$ from a roster of keys is established in the key register 10 during time period $T_1$. The key is applied to logical operator unit 14 and comparator unit 18 via cables 12 and 16, respectively, in time period $T_2$. The parity-check operation on the bits of the key is developed in logical operator 14 during time period $T_2$. This operation on the *n* bits of the key $k_1, \ldots k_n$ provides a parity-check sequence $P=p_1, p_2, \ldots p_{n-k}$ *of* $n-k$ bits long in accordance with the parity-check operation rule:

$$p_j=\sum_{i=1}^{n}\gamma_{ij}k_i$$

($j=1, 2, \ldots n-k$), where $\gamma_{ij}$ are binary coefficients and the $\Sigma$ is performed modulo-2.

The parity-check sequence $p_1, \ldots p_{n-k}$ is applied via cable 20 to primary memory address selector unit 24 which designates in time period $T_3$ a memory location in primary memory 28 with P as its address. If the required information record is located in primary memory 28, it is transferred to utilization device 55 in time period $T_5$. If the required information record is located in secondary memory 32, it is transferred to utilization device 55 in time period $T_{B+1}$.

In greater detail, a key from a roster of keys in the form of a binary code $K=k_1, k_2, \ldots k_n$ is established in a key register 10 on cable 8 and is applied thereform via cable 12 to logical operator 14 and via cable 16 to the comparator 18. Logical operator 14 includes switching circuit 15 and modulo-2 adder units 100, to be described later with reference to FIGS. 3 to 6. The output of logical operator 14 is applied via cable 20 to address selector 22. The primary memory address selector unit 24 of the address selector 22 designates via cable 26 an address location in primary memory section 28 of the memory 30, which corresponds to parity-check sequence established at the output of the logical operator 14 corresponding to key K in the key register 10.

Primary memory 28 has randomly accessible locations, e.g., 60–1, 60–2, 60–3, 60–4. Memory locations e.g., 60–1 and 60–3, have "0" in the identification bits and store information records associated with keys. Memory locations, e.g., 60–2 and 60–4 have "1" in their identification bits and store the starting addresses $A_1$ and $A_2$, respectively, of memory buckets in secondary memory 32. Secondary memory 32 has memory locations 70–1, 70–2, 70–3, 70–4, associated with a starting address $A_1$ and memory locations 80–1, 80–2, 80–3, 80–4, associated with a starting address $A_2$.

The memory 30 may be modified in accordance with particular operational circumstances. Illustratively, the primary memory 28 and the secondary memory 32 may be realized with two separate memory units, or they may be incorporated in a single memory unit. The primary memory 28 may, for example, be realized with a random access memory and the secondary memory 32 may be either a random access memory or a serial access memory, such as a magnetic tape, a magnetic drum or a magnetic disc.

The entry A at the address location in the primary memory 28 of the memory 30 designated by the address selector unit 24 is read out via cable 33 to a register 34. An identification binary digit associated with the entry A is established via conductor 36 in flip-flop 38 of identification register 40. The "1" portion of the flip-flop 38 is connected via connection 42 to AND unit 44 and the "0" portion thereof is connected via connection 46 and inverter unit 47 to OR unit 48. The output signal of comparator unit 18 is connected via cable 19 to flip-flop 23 in signal register 21. The "1" portion of flip-flop 23 is connected via connection 50 to the input of OR unit 48. The output of OR unit 48 is connected via connection 51 to AND unit 52. The register 34 is connected via cable 54 to AND unit 44, via cable 56 to AND unit 52, and via cable 58 to comparator unit 18. The "0" portion of flip-flop 23 of register 21 is connected via conductor 60 and inverter unit 62 to secondary address selector unit 64 of address selector 22. AND unit 52 is connected via cable 53 to utilization device 55.

The entry addressed in primary memory 28 is either the required information record or the starting address of the respective information bucket in the secondary memory 32. The entry A is transferred from memory 30 to register 34 and an identification bit associated therewith, either "1" or "0," is established in flip-flop 38 of identification register 40. If the identification bit is "0," the signal from the "0" portion of flip-flop 38 applied via connection 46 to inverter units 47 and OR unit 48 enables AND unit 52 to pass the information record from the register 34 to utilization device 55.

If the identification bit in flip-flop 38 is "1," AND unit 44 is enabled via connection 42. The entry addressed in the primary memory 28 indicates the appropriate starting address of a memory bucket, which consists of a sequence of memory locations, in the secondary memory 32. The starting address is transferred via register 34 and AND unit 44 to address selector 22. Secondary memory selector unit 64 of address selector 22 designates the appropriate starting address in secondary memory 32. The entry from the designated starting address in secondary memory 32 is then transferred from memory 30 to register 34. This entry consists of two portions, certain digits of a key and the information record associated with the key. The digits of the key are applied therefrom to comparator 18 which compares it with the corresponding digits of the key K in key register 10. If there is a match, flip-flop 23 is set to "1" and if there is not a match, flip-flop 23 is set to "0." When flip-flop 23 is set to "1," AND unit 52 is enabled via OR unit 48 and the information record in register 34 is transferred to utilization device 55 via cables 56 and 53. When flip-flop 23 is set to "0," the address selector unit 64 is stopped and the entry in the next memory location in the bucket is transferred from the secondary memory 32 to register 34 and its first portion which is certain digits of a key is transferred to comparator 18. In comparator 18, the portion is compared with the corresponding digits of the key in key register 10. This procedure is repeated for the sequence of memory locations in the designated bucket of secondary memory 32 until a match is obtained which is indicated by "1" in flip-flop 23. Then, the information record in register 34 corresponding to the given key is transferred to a conventional utilization device 55. Illustratively, the utilization device 55 may be a machine for establishing digital data in punched cards.

In terms of the group array associated with the roster of keys of which key K is a member, if the key established in key register 10 is the only key in a row thereof, the entry in the memory location in primary memory 28 addressed with the parity-check sequence P is the information record associated with the key. If the key K is one of a plurality of keys in a row of the associated group array, the related information record is obtained from the secondary memory 32.

The timing of the embodiment 6 of FIG. 1 will now be described in greater detail with reference to the timing diagram of FIG. 2. A key $k_1k_2k_3k_4$, with $n=4$ and $k=2$, is established in the key register 10 during time period $T_1$. In time period $T_2$, the key is applied to logical operator 14 and the corresponding parity-check sequence $p_1p_2$ is developed by logical operator 14. In time period $T_3$, the parity-check sequence $p_1p_2$ is applied to primary memory address selector unit 24 of address selector 22 and the address of the memory location in the primary memory 28 corresponding to the parity-check sequence is designated by cable 26. During time period $T_4$, the entry A in the memory location in the primary memory 28 is established in register 34, and the associated identification bit is established in flip-flop 38 of register 40. If the identification bit is "0," it indicates that the entry read from the memory location is the information record associated with the key. The information record is transferred to utilization device 55 in time period $T_5$. If the identification bit is "1," the entry A established in register 34 is the appropriate starting address, e.g., $A_1$ or $A_2$, of a memory bucket in the secondary memory 32. In time periods $T_6$ to $T_B$, where B depends on the size of the memory bucket, entries therein are successively read from its memory locations starting from that starting address. When a match is indicated by comparator 18, it means that the other portion of the read entry in register 34 is the information record associated with the given key. During time period $T_{B+1}$, the information is transferred to utilization device 55 from the register 34.

Certain details of key register 10 and logical operator 14 will be described with reference to FIGS. 3 to 6, for the special circumstances of two key rosters, $R_1$ and $R_2$. Two rosters of keys expressed as binary bit sequences $k_1k_2k_3k_4$ are $$R_1=(1110, 1111, 1000 \text{ and } 0111)$$

and $$R_2=(1110, 1101, 1111 \text{ and } 0101)$$

Figure 3:
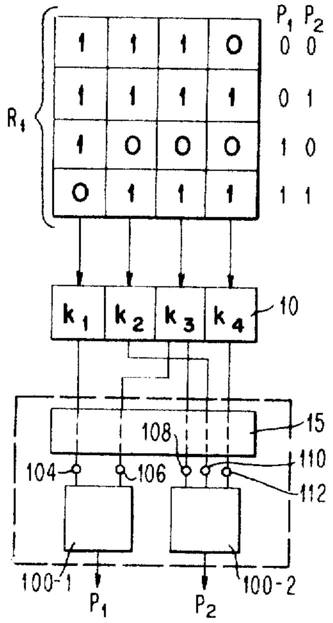
FIGURES 3 and 4 are block diagrams illustrating certain details of the logical operator of FIGURE 1.
Figure 4:
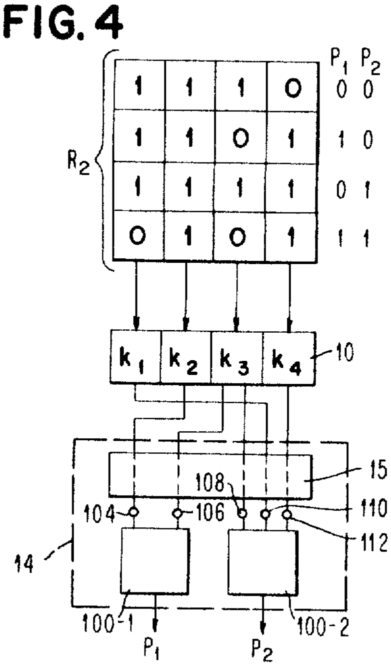

The rosters are shown in FIGS. 3 and 4, respectively, above the circuitry. The respective parity-check sequence $p_1p_2$ for a key $k_1k_2k_3k_4$ is tabulated adjacent the key. Logical operator 14 includes a switching circuit 15 and modulo-2 adder units 100–1 and 100–2. In FIG. 3 for $R_1$, the digit positions of register 10, corresponding to $k_1$ and $k_3$ are connected via switching circuit 15 to modulo-2 adder unit 100–1 and the digit positions corresponding to $k_2$, $k_3$ and $k_4$ are connected via switching circuit 15 to modulo-2 adder unit 100–2. In FIG. 4 for $R_2$, the digit positions corresponding to $k_2$ and $k_3$ are connected via switching circuit 15 to modulo-2 adder unit 100–1, and the digit positions corresponding to $k_1$, $k_3$ and $k_4$ are connected via switching circuit 15 to modulo-2 adder unit 100–2.

Figure 5:
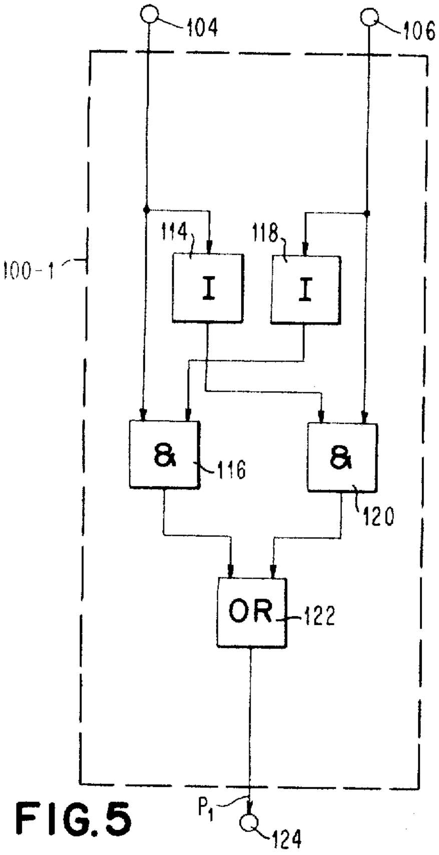
FIGURES 5 and 6 are schematic diagrams of modulo-2 adder units employed in the logical operator of FIGURE 1.
Figure 6:
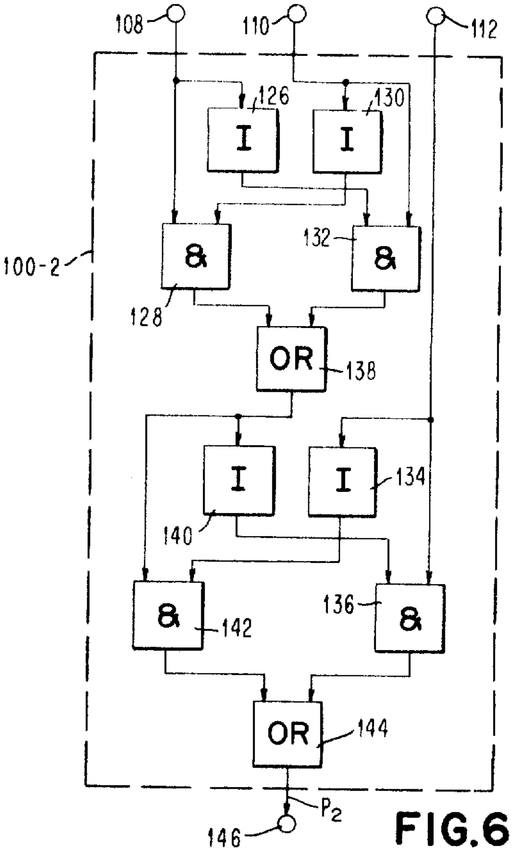

FIGS. 5 and 6 present modulo-2 adder units 100–1 and 100–2 for FIGS. 3 and 4, respectively, in greater detail. For roster $R_1$, the digits $k_1$ and $k_3$ of a constituent key thereof are introduced to terminals 104 and 106, respectively, of modulo-2 adder unit 100–1; and the digits $k_2$, $k_3$ and $k_4$ of the key are introduced to 110, 108 and 112, respectively, of modulo-2 adder unit 100–2. To use the modulo-2 adder units 100–1 and 100–2 for the roster of keys $R_2$, the wiring in switching circuit 15 is changed such that the digits $k_2$, $k_3$, $k_1$, $k_3$ and $k_4$ of a particular constituent key of the roster $R_2$ are introduced to terminals 104, 106, 110, 108 and 112, respectively, of modulo-2 adder units, 100–1 and 100–2.

In modulo-2 adder unit 100–1, inverter unit 114 and AND unit 116 are connected to terminal 104, and inverter unit 118 and AND unit 120 are connected to terminal 106. The outputs of inverter units 114 and 118 are connected to AND units 120 and 116, respectively. The outputs of AND units 116 and 120 are connected to the inputs of OR unit 122, whose output is connected to the $p_1$ terminal 124.

In modulo-2 adder unit 100–2, inverter unit 126 and AND unit 128 are connected to terminal 108, inverter unit 130 and AND unit 132 are connected to terminal 110, and inverter unit 134 and AND unit 136 are connected to terminal 112. The outputs of inverter units 126 and 130 are connected, respectively, to the inputs of AND units 132 and 128 whose outputs are connected to the inputs of OR unit 138. Inverter unit 140 and AND unit 142 are connected to the output of OR unit 138. The outputs of inverter units 140 and 134 are connected, respectively, to the inputs of AND units 136 and 142, whose outputs are connected to the input of OR unit 144 and the output of OR unit 144 is presented to the $p_2$ terminal 146.

Figure 7:
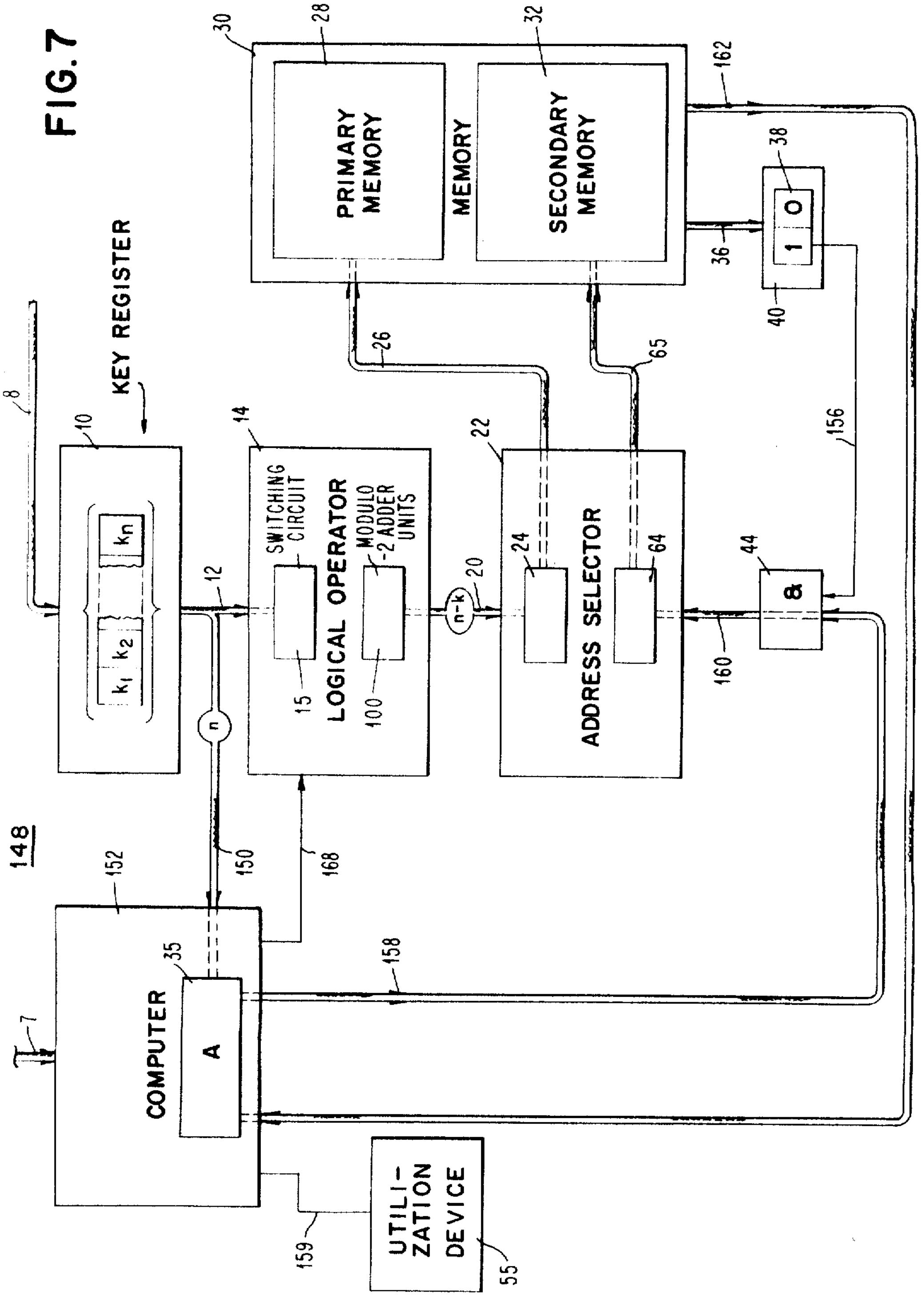
FIGURE 7 is a block diagram of an embodiment of the invention illustrating the use therein of a general purpose digital computer.

FIG. 7 provides an illustration of an information handling system 148 for the practice of this invention, utilizing a general purpose digital computer 152 which permits flexibility in changing a roster of keys. A key register 10 is connected via cable 150 to general purpose digital computer 152. Key register 10 is also connected via cable 12 to logical operator 14. Logical operator 14 is connected via cable 20 to address selector 22. Address selector unit 24 is connected via cable 26 to primary memory 28. Address selector unit 64 is connected via cable 65 to secondary memory 32. Memory 30 is connected via cable 36 to flip-flop 38 of identification digit register 40, which is connected via connection 156 to AND unit 44. The computer 152 is connected via cable 158 to AND unit 44 which is connected by cable 160 to address selector unit 64. Memory 30 is connected via cable 162 to computer 152. Logical operator 14 includes switching circuit 15 and modulo-2 adder units 100.

The general purpose digital computer 152 has a random access memory. When a roster of keys is changed, the roster of keys is introduced via input cable 7 to computer 152, which computes and provides an appropriate coset expansion of a group for the roster of keys by a computer program made according to the procedures described hereinbefore. It changes the switching circuit 15 in logical operator 14 via connection 168 in such a way as to realize the parity-check operation rule which was provided by the computer. Once the computer 152 identifies the appropriate coset expansion of a group for a given roster of keys, a key from cable 8 therein is introduced from key register 10 to logical operator 14 and the parity-check sequence developed thereby is provided by cable 20 to address selector 22, which designates an address in memory 30. If the desired information record corresponding to a key is at the address in the primary memory 28, it is passed via cable 162 to computer 152 and via cable 159 to utilization device 55. If the entry A at the address in the primary memory is a starting address for the secondary memory 32, the entry A is established in a register 34 in computer 152 and comparison of some digits of the given key with the key digits portion of the entry A is performed in computer 152. If there is no match, the next entry in the designated bucket in the secondary memory 32 is transferred to register 35 of computer 152. This process of reading entries in the bucket and comparison is repeated until a match is found. Generally, the operation of the embodiment of FIG. 7 is otherwise that of the embodiment presented in FIG. 1.

*Modifications of the embodiment of FIGURE 1*

The following are modifications of FIG. 1 suitable for the practice of the invention in certain circumstances.

(1) When a roster of keys is fixed and fast access time is a desired characteristic, the memory 30 may include only a primary memory because a coset expansion of a group can be obtained in which each row thereof includes at most one key.

(2) If the number of empty memory locations in memory 30 is to be minimized, or if the search time for the information used associated with a given key may be relatively long, the memory 30 may include only a secondary memory. For this case, a coset expansion is obtained with the property that the rows are arranged according to the order of respective parity-check sequences. Each of equally grouped rows include equal or almost equal number of keys. After the coset expansion is obtained, only the parity-check sequences of the first row in each grouped rows are used. This means use of a discrete set of parity-check sequences, i.e., parity-check sequences with zeros for their last few digits, instead of use of all the consecutive parity-check sequences. These parity-check sequences are used as addresses to the secondary memory. Therefore, the primary memory is not required.

A special case of circumstance (2). If non-uniform distribution of buckets in the secondary memory 32 is required, a sequence of a few digits, which may be different for each parity-check sequences may be added to the last few digits of each parity-check sequence in the discrete set of parity-check sequences. The number of digits to be added for each parity-check sequence must be specified in advance. The resultant addresses are more general Boolean functions of digits of a key than the relation between the digits of a parity-check sequence and the digits of a key.

Another special case of circumstance (2). When a roster of keys is changed often, some buckets in secondary memory 32 may overflow. The use of the open method described in the article "Addressing for Random-Access Storage," by W. W. Peterson, IBM Journal of Research and Development, April 1957, pp. 130–146, may be used satisfactorily to alleviate this difficulty. This method has been outlined hereinbefore.

(3) When the number of empty rows in a coset expansion is large, a coset expansion is obtained such that many empty rows appear at the end of the series of parity-check sequences. Then, corresponding empty memory locations may be eliminated or used for entirely different purposes.

(4) When a roster of keys is changed often and rosters of keys to be used are known in advance, interconnections between the digits of key register 10 and modulo-2 adder units, e.g., 100–1 and 100–2, in logical operator 14, may be changed in switching circuit 15. This change may be made by plug-wired boards or punched cards, in which wiring or contacts through punched holes are made according to each roster of keys.

*Practice of Feature II*

The second feature of this invention provides a file memory system with key to address transformation apparatus applicable for two circumstances. In the first circumstance, a roster of keys is given, which is divided into sub-rosters such that keys in a sub-roster have closer distances with a central key therein than with keys in other sub-rosters. If each sub-roster designates a bucket of memory locations, there is convenience in handling the associated information records in the memory. Generally, a change of information contents of a file memory or the search for information records therein often involves similar keys.

In the second circumstance of the practice of Feature II, even though a given key may have some erroneous digits, it is desirable to derive the information record from the file memory associated with the correct key.

In mathematical terms, a coset expansion of a group is obtained such that any binary code has a distance greater than a prescribed distance from the binary code which is in the column thereof in the first row of the group array, Table I. When a key is given, the procedure to locate a bucket information is to derive a binary code which is in the column thereof and in the first row in the group array.

The practice of Feature II has the following difference from Feature I. The practice of Feature I of the invention identifies with parity-check sequences, the rows of a coset expansion for given keys. However, the coset expansions need not have a distance property. The practice of Feature II of the invention identifies the columns of another coset expansion which has the noted distance property. The coset expansions for the practice of Feature II may be constructed in accordance with the text, "Error-Correcting Codes," by W. W. Peterson, The M.I.T. Press, 1962.

*Implementation of Feature II*

Figure 8:
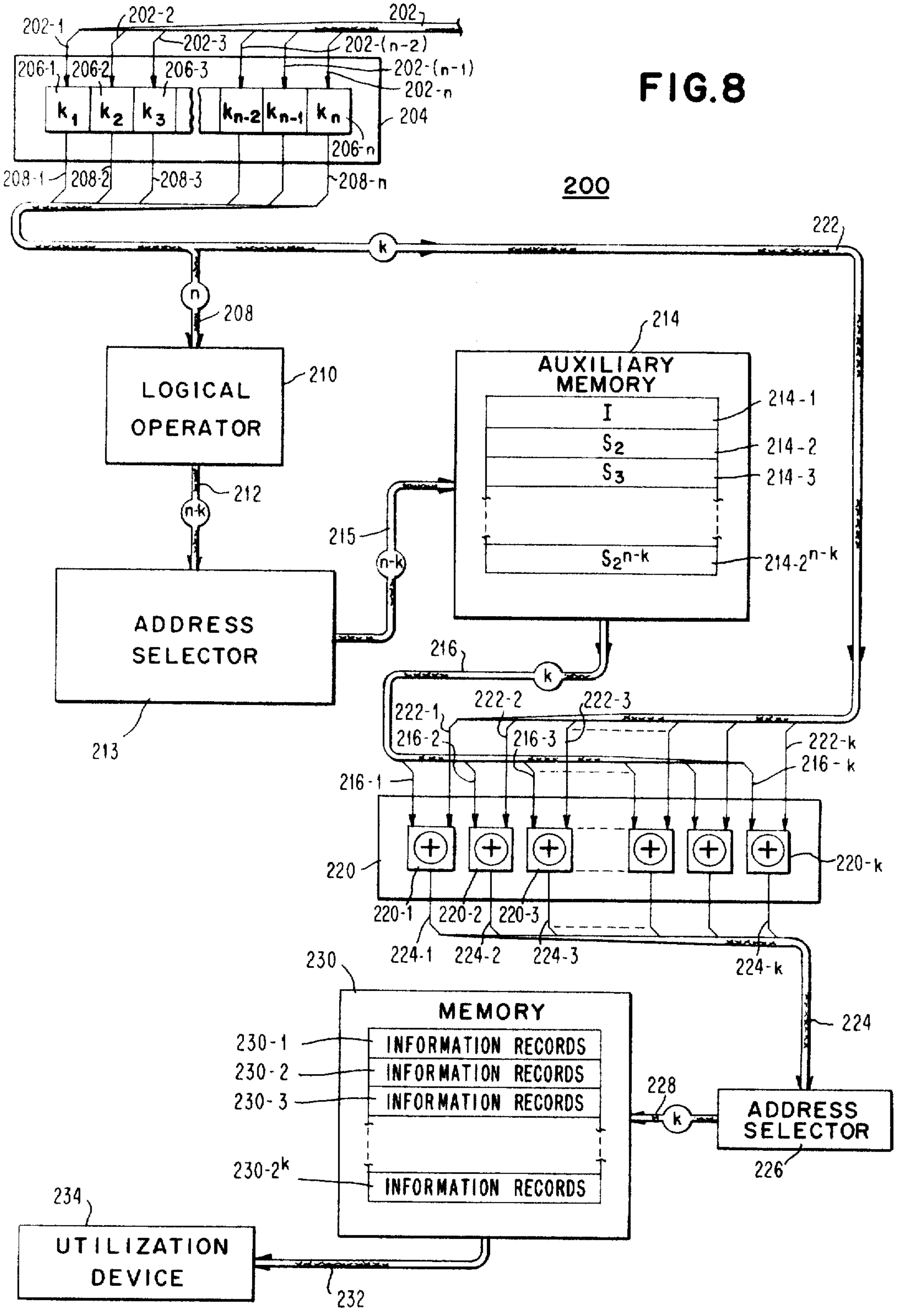
FIGURE 8 is a block diagram of an embodiment of the invention illustrating the use of coset leaders of a group array for input keys to obtain memory addresses.

Preferred embodiment 200 of this invention for the practice of the second feature thereof is illustrated in FIG. 8. The timing diagram presented in FIG. 2 is useful for understanding its operation.

Generally, a key is established in key register 204. Logical operator 210, which may be of the type described with reference to FIGS. 3 to 6, provides a parity-check sequence for the key when it is characterized as a code word in a group array, and the address selector 213 identifies the coset leader for the same row of the group array stored in auxiliary memory 214. Modulo-2 adder 220 provides the modulo-2 sum of the code word representative of the original key applied via cable 222 and the designated coset leader in auxiliary memory 214. Address selector 226 designates the particular bucket in memory 230 in which all records having associated keys within a given distance of each other are located. The information records in the designated bucket are applied to utilization device 234 via cable 232.

In greater detail, a key $K=k_1, k_2 \ldots k_n$ is established in storage cells 206 of register 204 via input lines 202–1, 202–2, . . . 202–$n$. Storage cells 206–1, 206–2, . . . 206–$n$ are connected via cable 208 having lines 208–1, 208–2, . . . 208–$n$ to logical operator 210. The output of logical operator 210, which is a parity-check sequence corresponding to the given key which is applied via cable 212 to address selector 213. Address selector 213 addresses auxiliary memory 214 via cable 215 with the parity-check sequence. An addressed memory location of auxiliary memory 214 holds $k$ digits of a coset leader of a row of the coset expansion corresponding to the parity-check sequence provided by logical operator 210. Auxiliary memory 214 includes memory locations 214–1, 214–2, . . . 214–$2^{n-k}$ in which are established the coset leaders, I, $S_2$, $S_3$, . . . $S_{2^{n-k}}$ of a coset expansion of a group array, respectively, characterized for the particular roster of input keys. The output information from auxiliary memory 214, which is $k$ digits of a designated coset leader, is applied via cable 216 to modulo-2 adder units of logical operator 220. Lines 216–1, 216–2, . . . 216–$k$, are connected to modulo-2 adder units 220–1, 220–2, . . . 220–$k$, respectively. $k$ storage cells of register 204, for example, 206–1, 206–2, . . . 206–$k$, are connected on lines 222–1, 222–2, . . . 222–$k$ to modulo-2 adder units 220–1, 220–2, . . . 220–$k$, respectively. The outputs of modulo-2 adder units 220–1, 220–2, . . . 220–$k$ are connected, respectively, on lines 224–1, 224–2, . . . 224–$k$ to address selector 226 which designates via cable 228 the sequence of information records in memory 230 associated with the key in key register 204. The aggregate of information records designated in memory 230 is transferred via cable 232 to utilization device 234.

Again referring to FIG. 8, for the first circumstance of the practice of Feature II, where there are a plurality of codes per column of the group array, $k$ digits from logical operator 220 designate the address of a bucket of memory locations in memory 230. Zeros are added after the $k$ digits from logical operator 220 in order to get discrete steps of addresses, each of which specifies a memory bucket. As described previously, for the second circumstance of the practice of Feature II, where there is one code per column for correction of erroneous digits, $k$ digits from logical operator 220 designates the address of each memory location in memory 230.

The operation of embodiment 200 of the invention for the case where there is more than one code per column will now be further described with reference to FIG. 8 and the timing diagram of FIG. 2. In time period $T_1$, a key $K=k'_1, k'_2 \ldots k'_n$ in a roster of keys is established in storage cells 206–1, 206–2, . . . 206–$n$ of register 204 via input lines 202–1, 202–2, . . . 202–$n$. In time period $T_2$, key K is applied via cables 208 and 222 to logical operators 210 and 218, respectively. Logical operator 210 provides the parity-check sequence for key K in accordance with the expression:

$$p'_j = \sum_{i=1}^{n} \gamma'_{ij} k'_i$$

($j=1, 2, \ldots n-k$), where $p'_j$ is the $j$-th bit of the parity-check sequence, $\gamma'_{ij}$ is a coefficient, "1" or "0," which is determined from the coset expansion of a group for the roster of keys. The primes are utilized to distinguish the matrix $[\gamma_{ij}]$ for the practice of Feature I from the matrix $[\gamma'_{ij}]$ for the practice of Feature II. Address selector 213 designates via cable 215 in time period $T_3$ one of the coset leaders I, $S_2$, $S_3$, . . . $S_{2^{n-k}}$ in auxiliary memory 214. Then, $k$ digits of the designated coset leader are applied via cable 216 to logical operator 220 in time period $T_4$. The modulo-2 sums of the $k$ digits from cable 216 and the $k$ digits from cable 222 are formed in modulo-2 adder units 220–1 to 220–$k$, respectively, and applied via cable 224 to address selector 226. It designates in time period $T_5$ an address for a memory location or the starting address of one bucket of the memory locations, 230–1, 230–2, . . . 230–$2^k$ in memory 230. The appropriate sequence of information records identified by key K is applied via cable 232 to conventional utilization device 234. Illustratively, the utilization device 234 may be a machine for establishing digital data in punched cards.

The following numerical example will aid in understanding the operation of the embodiment 200 illustrated in FIG. 8 described above. The following roster of keys is given:

| | |
|---|---|
| $K_1=(1010000)$ | $K_6=(1110100)$ |
| $K_2=(0110000)$ | $K_7=(1000100)$ |
| $K_3=(1101000)$ | $K_8=(0100100)$ |
| $K_4=(0101000)$ | $K_9=(1100001)$ |
| $K_5=(1001000)$ | $K_{10}=(0010001)$ |

$K_1$ to $K_2$, $K_3$ to $K_5$, $K_6$ to $K_8$, and $K_9$ to $K_{10}$ are to be established in the same buckets, respectively, of memory 230. The following is an appropriate parity-check operation:

$$p_1 = k_1 \oplus \quad \oplus k_4 \oplus k_5 \quad \oplus k_7$$
$$p_2 = k_2 \oplus k_4 \oplus k_6 \oplus k_7$$
$$p_3 = k_3 \oplus k_5 \oplus k_6 \oplus k_7$$

The corresponding coset expansion is as follows. Only a part of the expansion is shown. The given keys are underlined.

| | | | | | |
|---|---|---|---|---|---|
| 0000000 | 1101000 | 1010100 | 1110001 | . | .... |
| 1000000 | 0101000 | 0010100 | 0110001 | . | .... |
| 0100000 | 1001000 | 1110100 | 1010001 | . | .... |
| 0010000 | 1111000 | 1000100 | 1100001 | . | .... |
| 1100000 | ....... | ....... | 0010001 | . | .... |
| 1010000 | ....... | ....... | ....... | . | .... |
| 0110000 | ....... | ....... | ....... | . | .... |
| 1110000 | 0011000 | 0100100 | ....... | . | .... |

The last four digits of the coset leaders (0000000), (1000000), (0100000), . . . (1110000) are stored in the auxiliary memory 214, i.e., (0000), (0000), (0000) and (0000), respectively. Illustratively, if the key (0100100) is given, the parity-check sequence (111) is provided by logical operator 210 according to the above parity-check operation. The auxiliary memory 214 is addressed by the parity-check sequence (111). In the addressed memory location the last four digits (0000) of the coset leader (1110000) is found. These digits (0000) are added modulo-2 to the last four digits (0100) of the given key by logical operator 220. The resultant digits (0100) on line 224–1 to 224–$k$ cause address selector 226 to designate the address via cable 228 in memory 230. For the first circumstance, if the maximum number of keys from the roster in a column is four, two zeros are added after the resultant digits to obtain (010000). This address in the memory 230 reaches the bucket of information records in memory 230 is memory locations starting with this address (010000).

The nature and operation of another embodiment 300 of this invention for the practice of the second feature thereof will be described with reference to the block diagrams of FIGS. 9 and 10 and the timing diagram of FIG. 2. Background information of interest with regard to decoder unit 302 thereof is presented in the book: "Error-Correcting Codes," by W. W. Petersen, John Wiley and Sons, Inc., 1961, particularly page 201, et seq. The decoder unit 302 illustrated in FIG. 9 has been designed to decode a key considered as a binary Fire code generated by the generator polynomial $$G(x)=(x^5+x^2+1)(x^9+1)=x^{14}+x^{11}+x^9+x^5+x^2+1$$

In the art of error-correcting codes this Fire code has a length $n=9(2^5-1)=279$ and corrects any single burst error of length 5 or less. It has 14 check digits and 265 information digits. Therefore the keys for the practice of this invention with the embodiment 300 have $n=279$, $k=265$ and $n-k=14$. The register 312 is only partially illustrated in FIG. 9. It is shown in greater detail in FIG. 10.

A key $K=k_1, k_2, \ldots k_n$ of a roster of keys is introduced to decoder unit 302 at terminal 301 thereof. The key is established via line 303 in a buffer shift register 304 which has storage cells 304–1, 304–2, . . . 304–$n$. It is also introduced via line 306 and modulo-2 adder units 308 and 310 to shift register 312. The output of modulo-2 adder unit 310 is connected via line 314 to modulo-2 adder units 316–1 to 316–4 and via line 318 to storage cell 312–1. The outputs of storage cells 312–1, 312–2, . . . 312–$(n-k)$, are connected, respectively, via lines 320–1, 320–2, . . . 320–$(n-k)$ to combinational logic circuit 322 whose input is connected via lines 323 and 325 to modulo-2 adder unit 308 and via lines 323 and 326 to modulo-2 adder unit 328.

The combinational logic circuit 322 is designed to have a 1 at its output 323 if and only if a parity-check sequence, whose corresponding coset leader has a 1 at its highest position digit, appears in lines 320–1 to 320–$(n-k)$. Such a combinational logical circuit can be realized by conventional logical design technique: See a book: "Logical Design of Digital Computers," by M. Phister, Jr., Wiley and Sons, Inc., 1958. Combinational logic circuit 322 is designed in accordance with the conventional technique using a truth table.

The output from storage cell 304–$n$ of buffer shift register 304 is connected via line 330 to modulo-2 adder unit 328. The output digits $k'_1, k'_2, \ldots k'_n$ are presented by modulo-2 adder unit 328 to terminal 327 digit by digit as buffer shift register 304 is shifted and are established in storage cells 336–1, 336–2, . . . 336–$n$ of shift register 336. Then, $k$ of the $n$ binary digits $k'_1, \ldots k'_n$ in shift register 336 are applied via lines 338–1, 338–2, . . . 338–$k$ of cable 338 to address selector unit 340 which is connected via cable 341 to memory 342. The sequence of information records at the designated address in memory 342 is transferred via cable 344 to conventional utilization device 346. Utilization device 346 may be a machine for establishing digital data in punched cards.

The shift register 312 with the associated leads will now be described in greater detail with reference to FIG. 10. It includes storage cells 312–1 to 312–4 which are related to the terms of the greater polynomial $$G(x)=1+x^2+x^5+x^9+x^{11}+x^{14}$$

Modulo-2 adder unit 316–1 is connected between storage cells 313–3 and 312–3. Modulo-2 adder unit 316–2 is connected between storage cells 312–5 and 312–6. Modulo-2 adder unit 316–3 is connected between storage cells 312–9 and 312–10. Modulo-2 adder unit 316–4 is connected between storage cells 312–11 and 312–12. The modulo-2 adder units 316–1 to 316–4 are disposed before the storage cells 312–3, 312–6, 312–10 and 312–12 which correspond to the terms $x^2$, $x^5$, $x^9$ and $x^{11}$, respectively, of the generator polynomial $G(x)$.

Lines 320–1 to 320–8 are connected to combinational logic circuit 322 from the outputs of storage cells 312–1, 312–2, 312–4, 312–5, 312–6, 312–7, 312–8 and 312–9, respectively. The output of modulo-2 adder unit 316–3 is connected to combinational logic circuit 322 via line 320–9. The outputs of storage cells 312–10 and 312–11 are connected to combinational logic circuit 322 via lines 320–10 and 320–11, respectively. The outputs of modulo-2 adder unit 316–4 is connected to combinational logic circuit 322 via line 320–12. The outputs of storage cells 312–12, 312–13 and 312–14 are connected to combinational logic circuit 320 via lines 320–13, 320–14 and 320–15, respectively. The output of storage cell 312–14 is also connected via line 321 to an input modulo-2 adder unit 310.

Figure 9:
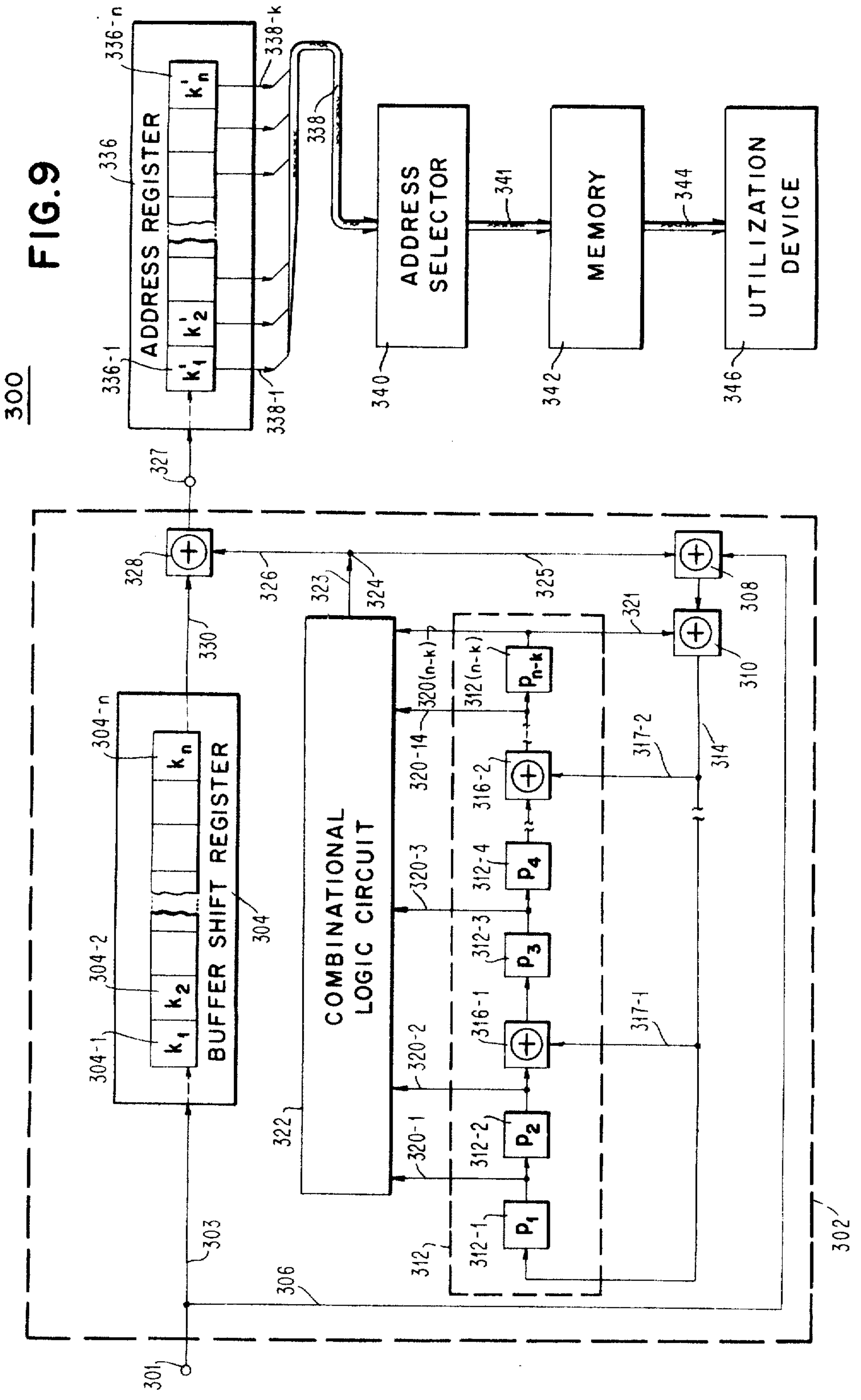
FIGURE 9 is a block diagram of an embodiment of the invention illustrating implementation for input keys characterized as codes of polynomial codes.
Figure 10:
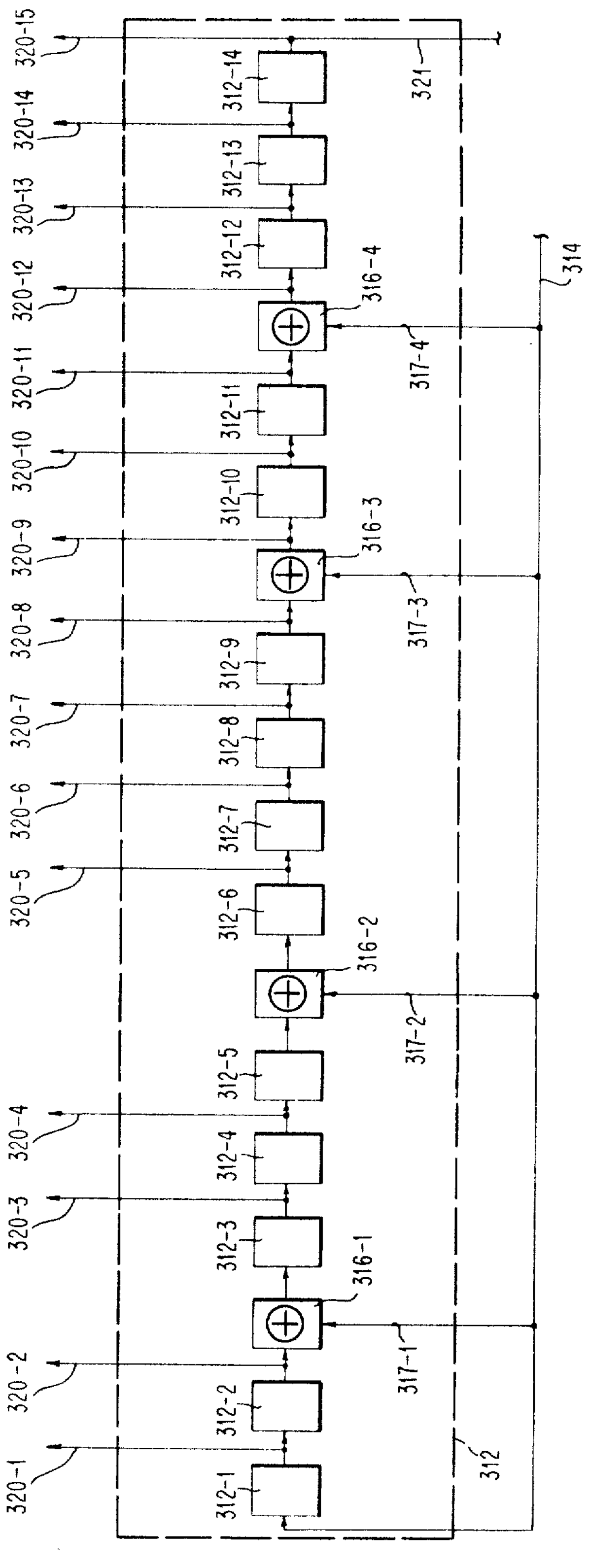
FIGURE 10 is a block diagram illustrating a portion of FIGURE 9 in greater detail.

The output of storage cell 312–14 is connected to an input modulo-2 adder unit 310 (FIG. 9). Line 314 is connected from this output of modulo-2 adder unit 310 to the input of storage cell 312–1. Lines 317–1 to 317–4 are connected between line 314 and modulo-2 adder units 316–1 to 316–4, respectively.

Thus, the parity-check sequences $p_1, p_2, \ldots p_{n-k}$ for the keys $k_1, k_2, \ldots k_n$ applied to terminal 301 (FIG. 9) are established in the storage cells 312–1 to 312–$(n-k)$ of shift register 312. For the particular keys for which the register 312 is designed, storage cell 312$(n-k)$ is the same as storage cell 312–14. In the operation of shift register 312, the binary digits which are established in storage cells 312–1 to 312$(n-k)$ are shifted one position for each additional digit applied to terminal 301.

For the first circumstance, where a number of codes within a prescribed distance of each other are located in a column of a group array, the binary sequence of $k$ digits from shift register 336 designates via address selector 340 a starting address of a bucket of memory locations in memory 340. A sufficient number of zeros are added to the $k$ digits to span the number of memory locations in a bucket.

For the second circumstance, one key is established per column in a group array of codes with distance property and $k$ digits from shift register 336 designates the address of each memory location. If the given key has certain erroneous digits, it becomes another code in the same column of the group array, and the proper address is still obtained.

The timing operation of the embodiment 300 of FIG. 8 will be described with reference to the timing diagram of FIG. 2. In time period $T_1$, a given key K is established in buffer shift register 304 and the parity-check sequence therefor is developed by decoder 302. In time period $T_2$, a binary code, which is in the first row of a coset expansion of a group array and in the same column with the given key, is established in shift register 336. This binary code includes the parity-check sequence in some digit positions of it. In time period $T_3$, a respective address in memory 342 corresponding to $k$ of the $n$ digits of the binary sequence in shift register 336 is designated by address selector 340. In time period $T_4$, a sequence of information records in memory 340 is sent to utilization device 346.

In the operation of decoder unit 302, a given key whose corresponding information record is to be obtained from memory 340 is applied digit by digit to buffer shift register 304 and via modulo-2 adder units 308 and 310 to shift register 312. The shift register 312 is used to develop a parity-check sequence corresponding to the given key. There is a one-to-one correspondence between the parity-check sequence which appears in the shift register 312 and the coset leader of the row of the group array to which the given key belongs. The combinational logic circuit 322 provides a "1" on line 323 to terminal 324 when the parity-check sequence in shift register 312 corresponds to a coset leader having "1" in the digit of the highest order position, i.e., the next digit about to come out from buffer register 304. Hence, the correction of the next digit to come out of buffer shift register 304 is accomplished by adding it to the output of combinational logic circuit in modulo-2 adder 328. When the digit from buffer register 304 is corrected, the parity-check sequence in shift register 312 is also shifted and altered, by applying the output of combinational logic circuit 322 via modulo-2 adder units 308 and 310 to storage cell 312–1 of shift register 312, and modulo-2 adder units 316–1 to 316–4.

The foregoing shifting technique is repeated until the entire key K is read out of buffer register 304 by shifting buffer register 304 digit by digit. For each digit read out of buffer register 304, both buffer register 304 and shift register 312 have been shifted one digit to the right and its output is sent to shift register 336. The output of the combinational logic circuit 322 at terminal 324 indicates if the next digit coming out of the buffer shift register 304 is to be corrected via modulo-2 adder unit 328. When the entire key in buffer shift register 304 is read out, a binary code which is in the first row of a coset expansion of a group array and in the same column with the given key in stored in shift register 336. The number of binary codes in the first row of a coset expansion is $2^k$ and identification of a binary code among them can be made by certain $k$ of $n$ digits of a binary code. These $k$ digits in shift register 336 are used to address memory 342.

For the first circumstance, if a chosen error-correcting code has a distance $d$, then every binary code which has distance not greater than $d$ from a binary code in the first row of a coset expansion of a group is in the same column with that binary code in the first row. Therefore, if keys in a column of a group array are placed at a distance not greater than $d$ from a binary code of that column, a bucket of memory locations in memory 342 to which a given key belongs is designated by address selector 342.

For the second circumstance, if some digits of a given key are erroneous but if the number of these erroneous digits is such that the key is still in the same column of the group array with the correct key corresponding to it, the information record associated with the correct key is still addressed in memory 342.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A file memory system operable in a key to address transformation mode comprising;
   - file memory means for storing information records at addresses therein;
   - means for introducing keys characterized as binary codes in a group array to said system selectively;
   - means for transforming in accordance with said group array said codes to parity-check sequences thereof; and
   - means responsive to said parity-check sequences for addressing said file memory means.

2. Information handling system operable in a key to address mode comprising:
   - file memory means for storing information records at addresses therein;
   - means for introducing keys to said system, selectively;
   - means for establishing said keys as elements in a coset expansion of a group array;
   - means for transforming in accordance with said coset expansion said elements to functions thereof; and
   - means responsive to said functions for addressing said file memory means.

3. Information handling system operable in a key to address transformation mode comprising:
   - file memory means for storing information records at addresses therein;
   - means for introducing said keys to said system selectively;
   - means for establishing said keys as binary codes in a coset expansion of a group array;
   - means for transforming in accordance with said coset expansion said codes to Boolean functions thereof; and means responsive to said functions for addressing said file memory means.

4. Information handling system operable in a key to address transformation mode comprising:

file memory means for storing information records at addresses therein;

means for introducing said keys to said system selectively;

means for establishing said keys as binary codes in a coset expansion of a group array;

means for transforming in accordance with said coset expansion said codes to parity-check sequences thereof; and means responsive to said parity-check sequences for addressing said file memory means.

5. Information handling system operable in a key to address transformation mode comprising:

file memory means for storing information records at addresses therein;

means for introducing said keys to said system, selectively;

digital computer means for establishing said keys as codes in a coset expansion of a group array;

means for transforming in accordance with said coset expansion said codes to parity-check sequences thereof; and means receptive to said parity-check sequences for addressing said file memory means.

6. A file memory system operable in a key to address transformation mode comprising:

file memory means for storing information records at addresses therein;

means for introducing keys to said system selectively, said keys being characterized as codes in a group array, each said code being a character sequence;

means for transforming in accordance with said group array said codes to check sequences thereof; and means responsive to said check sequences for addressing said file memory means.

7. File addressing system operable in a key to address transformation mode comprising:

file memory means for storing information records at addresses therein;

means for introducing keys to said system selectively, said keys being characterized as codes in a group array;

modulo-2 adder means for transforming in accordance with said group array said codes to parity-check sequences thereof; and address selector means responsive to said parity-check sequences for addressing said file memory means.

8. A file memory system operable in a key to address transformation mode comprising:

file memory means for storing information records at addresses therein;

means for introducing said keys to said system selectively, said keys being characterized as codes in a group array, each said code being a binary digit sequence $k_1k_2 \ldots k_n$;

means for transforming in accordance with said group array said codes to respective parity-check sequences $p_1, p_2 \ldots p_{n-k}$ according to the expression $$p_j = \sum_{i=1}^{n} \gamma_{ij} k_i$$

($j=1, 2, \ldots n-k$), where $\Sigma$ is modulo-2 and $[\gamma_{ij}]$ is a characteristic matrix of said group array; and means responsive to said parity-check sequences for addressing said file memory means.

9. A file memory system operable in a key to address transformation mode comprising:

file memory means for storing information records at addresses therein;

means for introducing keys to said system selectively, said keys being characterized as codes in respective rows of a group array;

means for transforming in accordance with said group array said codes to parity-check sequences thereof; and means responsive to said parity-check sequences for addressing said file memory means.

10. A file memory system operable in a key to address transformation mode comprising:

file memory means for storing information records at addresses therein;

means for introducing said keys to said system selectively, said keys being characterized as codes in respective rows of a group array, each said key being a binary digit sequence $k_1k_2, \ldots k_n$;

means for transforming in accordance with said group array said codes to parity-check sequences $p_1, p_2 \ldots p_{n-k}$ thereof, said parity-check sequences given by the expression $$p_j = \sum_{i=1}^{n} \gamma_{ij} k_i$$

($j=1, 2, \ldots n-k$), where $\Sigma$ is modulo-2 and $\gamma_{ij}$ is an element of a characteristic matrix of said group array; and means responsive to said parity-check sequences for addressing said file memory means.

11. A file memory system operable in a key to address transformation mode comprising:

file memory means for storing information records at addresses therein;

key register means for introducing keys to said system selectively, said keys being characterized as codes in respective rows of a group array; each said key being a binary digit sequence $k_1, k_2 \ldots k_n$;

logical operator means for providing in accordance with said group array a parity-check sequence $p_1, p_2 \ldots p_{n-k}$ for said keys given by the expression $$p_j = \sum_{i=1}^{n} \gamma_{ij} k_i$$

($j=1, 2, \ldots n-k$), where $\Sigma$ is modulo-2 and $\gamma_{ij}$ is an element of a characteristic matrix $[\gamma_{ij}]$ of said group array;

address selector means responsive to said parity-check sequences for addressing said file memory means;

a utilization device for said information records; and means for transferring said information records at said designated addresses in said memory means to said utilization device.

12. A file memory system operable in a key to address transformation mode comprising:

key register means for introducing said keys to said system selectively, said keys being characterized as codes in rows of a group array;

file memory means for storing information records, said file memory means having a primary memory unit and a secondary memory unit;

said primary memory unit having information storage locations with identification digits associated therewith;

said secondary memory unit storing information records overflowing from said primary memory unit when a row of said group array has more than one said key therein;

logical operator means for transforming in accordance with said group array said codes to parity-check sequences thereof, said logical operator means including;

modulo-2 adder units for providing said parity-check sequences according to the expression $$p_j = \sum_{i=1}^{n} \gamma_{ij} k_i$$

($j=1, 2, \ldots n-k$), where Σ is modulo-2 and $\gamma_{ij}$ is an element of the matrix characteristic of said group array;

address selector means responsive to said parity-check sequences for designating addresses in said memory means, said address selector means having a first address selector unit for said primary memory unit and a secondary address selector unit for said secondary unit, said first address selector unit being responsive to said parity-check sequences for designating addresses in said primary memory unit, said second address selector unit being responsive to each said address stored in said secondary memory unit and designating the next address therein if said address does not compare with said key in said key register;

information storage register means for storing an addressed information record from said first memory unit;

identification digit register means receptive to said identification digit for said information record in said primary memory unit;

a utilization device connected to said file means receptive of said addressed information record therein when said information record corresponds to said key in said key register means; and comparator means for providing a signal enabling said second address selector unit to step said address in said second memory unit and for providing a signal for enabling said utilization device to accept said information record addressed in said file memory means.

13. A file memory system operable in a key to address transformation mode comprising:

file memory means for storing information records at addresses therein;

means for introducing keys to said system selectively, said keys being characterized as codes arranged in rows of a group array, each said row having a coset leader, each said key being within a given distance from a code in the first row of said array and being within the same column of said array, respectively;

auxiliary memory means for storing the coset leaders of said group array;

means for transforming in accordance with said group array said keys to parity-check sequences to designate said coset leaders in said auxiliary memory means, means for obtaining said first row codes by obtaining functions of said keys and said coset leaders, respectively; and means responsive to said first row codes for addressing said file memory means.

14. File memory system operable in a key to address transformation mode comprising:

file memory means for storing said information records at addresses therein;

means for introducing said keys to said system selectively, said keys being characterized as codes in a group array having rows and columns for a polynomial error-correcting code;

said file memory means having addresses for keys within a given distance of each other as identified by a particular column of said group array;

means for identifying the particular columns of said group array by said first row codes for said keys; and means responsive to said first row codes for addressing said file memory means.

15. A file memory system operable in a key to address transformation mode comprising:

file memory means for storing information records at addresses therein;

means for introducing said keys to said system selectively, said keys being characterized as codes arranged in rows and columns of an error-correcting code group array;

said file memory means having an aggregate of addresses for selected keys within a given distance of each other as designated by the first row code of a particular column of said group array in which said keys within said particular distance are located; and means for identifying said first row codes; and means responsive to said first row codes for addressing said file memory means.

16. A file memory system operable in a key to address transformation mode comprising:

file memory means for storing information records as addresses therein;

means for introducing keys to said system selectively, said keys being characterized as codes in a group array of rows and columns, said keys in each column being a lesser distance from each other than from keys in other columns, said keys in said first column being coset leaders;

auxiliary memory means for storing said coset leaders;

means for transforming in accordance with said group array said keys to parity-check sequences to identify said coset leaders in said auxiliary memory means;

means for obtaining said first row codes as modulo-2 sums of said keys and said coset leaders, respectively; and means responsive to said first row codes for addressing said file memory means.

17. Key to address transformation apparatus which provides particular addresses for different keys satisfying given distance requirements comprising:

means for providing said keys, said keys being representable as code words of an error-correcting code;

means for generating an address by operating in accordance with a generator of said error-correcting code on one of said key represented as code word of said error-correcting code which to map said keys satisfying said distance requirements onto said particular addresses;

means for applying said key to said generating means;

a memory; and means for applying said generated address to said memory.

18. Key to address transformation apparatus which provides the same address for different keys which are within a given distance of each other comprising:

means for providing said keys, said keys being representable as code words of an error-correcting code;

means for generating an address by operating in accordance with a generator of said error-correcting code; on a key represented as a code word of said error-correcting code to map said keys which are within a given distance of each other onto the same address;

means for applying said key to said generating means;

a memory; and means for applying said generated address to said memory.

References Cited by the Examiner

UNITED STATES PATENTS

| | | | |
|---|---|---|---|
| 3,036,773 | 5/1962 | Brown | 235—157 |
| 3,089,125 | 5/1963 | Reynolds | 340—172.5 |
| 3,111,648 | 11/1963 | Marsh et al. | 340—172.5 |
| 3,202,971 | 8/1965 | Blaauw | 340—172.5 |

R. M. RICKERT, *Assistant Examiner.*

ROBERT C. BAILEY, *Primary Examiner.*